United States Patent
Chien et al.

(10) Patent No.: US 7,812,889 B2
(45) Date of Patent: Oct. 12, 2010

(54) CONTROL SYSTEM FOR SYNCHRONOUSLY CONTROLLING DISPLAY DEVICE AND PLAY DEVICE

(75) Inventors: Wen-Chang Chien, Miao Li County (TW); Jih-Shun Lo, Miao Li County (TW)

(73) Assignee: Coretronic Corporation, Chu-Nan, Miao Li County (TW)

( * ) Notice: Subject to any disclaimer, the term of this patent is extended or adjusted under 35 U.S.C. 154(b) by 1117 days.

(21) Appl. No.: 11/490,082

(22) Filed: Jul. 21, 2006

(65) Prior Publication Data

US 2007/0024754 A1    Feb. 1, 2007

(30) Foreign Application Priority Data

Jul. 29, 2005   (TW) ............................. 94125832 A

(51) Int. Cl.
H04N 5/44 (2006.01)
H04N 5/50 (2006.01)
H04N 9/00 (2006.01)
H04N 9/76 (2006.01)
H04N 7/00 (2006.01)
H04N 11/00 (2006.01)
H04N 5/268 (2006.01)

(52) U.S. Cl. ................... 348/569; 348/598; 348/552; 348/553; 348/462; 348/466; 348/705; 386/39; 386/46; 386/95

(58) Field of Classification Search ........... 348/461, 348/462, 466, 552, 553, 563, 569, 598, 705, 348/706; 386/33, 39, 46, 95, 109, 124

See application file for complete search history.

(56) References Cited

U.S. PATENT DOCUMENTS

| | | | | |
|---|---|---|---|---|
| 5,532,753 A * | 7/1996 | Buchner et al. | ............... | 725/56 |
| 5,760,842 A * | 6/1998 | Song | ............... | 348/564 |
| 5,774,187 A * | 6/1998 | Tsunoda | ............... | 348/553 |
| 5,956,093 A * | 9/1999 | Yang | ............... | 348/554 |
| 6,002,449 A * | 12/1999 | Tsyrganovich | ............... | 348/725 |
| 6,313,873 B1 * | 11/2001 | Lee | ............... | 348/177 |
| 6,490,002 B1 * | 12/2002 | Shintani | ............... | 348/569 |
| 6,646,685 B1 * | 11/2003 | Kim | ............... | 348/569 |
| 6,714,253 B2 * | 3/2004 | Kim et al. | ............... | 348/556 |
| 6,825,858 B2 * | 11/2004 | Sato | ............... | 715/735 |
| 7,095,447 B2 * | 8/2006 | Lee | ............... | 348/569 |
| 7,162,145 B2 * | 1/2007 | Na et al. | ............... | 386/83 |
| 7,224,404 B2 * | 5/2007 | An et al. | ............... | 348/584 |
| 7,274,360 B2 * | 9/2007 | Irie | ............... | 345/204 |
| 7,298,424 B2 * | 11/2007 | Oh | ............... | 348/706 |
| 7,372,506 B2 * | 5/2008 | Cho | ............... | 348/569 |
| 7,456,905 B2 * | 11/2008 | Fujinami | ............... | 348/706 |
| 7,466,363 B2 * | 12/2008 | Shimozawa et al. | ............... | 348/569 |
| 7,554,614 B2 * | 6/2009 | Satou | ............... | 348/734 |
| 7,636,127 B2 * | 12/2009 | Adachi | ............... | 348/569 |
| 7,667,774 B2 * | 2/2010 | Murakami | ............... | 348/500 |

(Continued)

*Primary Examiner*—Brian P Yenke
(74) *Attorney, Agent, or Firm*—Birch, Stewart, Kolasch & Birch, LLP

(57) ABSTRACT

A control system for controlling video and audio parameters of a display device and a play device is provided. An OSD system of the play device and an OSD system of the display device receive OSD signals respectively. The OSD signals are transmitted between the play device and the display device through a bus. Therefore, the video and audio parameters are controlled synchronously by the OSD signals. Furthermore, displayed images and sound are controlled as well.

20 Claims, 4 Drawing Sheets

U.S. PATENT DOCUMENTS

| | | |
|---|---|---|
| 2002/0197056 A1* | 12/2002 | Morikawa .................... 386/46 |
| 2003/0067558 A1* | 4/2003 | Shintani et al. ............. 348/569 |
| 2005/0078840 A1* | 4/2005 | Riedl ......................... 381/104 |
| 2005/0120374 A1* | 6/2005 | Stone et al. .................. 725/80 |
| 2007/0255433 A1* | 11/2007 | Choo .......................... 700/94 |
| 2008/0025707 A1* | 1/2008 | Sawada et al. ............. 386/126 |
| 2008/0129820 A1* | 6/2008 | Chang et al. .................. 348/61 |
| 2009/0129363 A1* | 5/2009 | Lindsey et al. .............. 370/345 |

* cited by examiner

CONTROL SYSTEM FOR SYNCHRONOUSLY CONTROLLING DISPLAY DEVICE AND PLAY DEVICE

BACKGROUND OF THE INVENTION (1) Field of the Invention

The present invention generally relates to a control system, and particularly to a control system for controlling video and audio parameters of a display device and a play device synchronously.

(2) Description of the Related Art

Please refer to FIG. 1. FIG. 1 illustrates a display device 2 and a play device 4 according to a prior art. The play device 4, such as a DVD play device or a VCD play device, includes a data presentation module 402. The display device 2, such as a television or a projector, includes a display module 202. The display module 202 further includes an image display module and a sound display module for displaying images and sound respectively.

The play device 4 utilizes the data presentation module 402 to process video data and audio data, so that the display module 202 of the display device 2 displays and generates the corresponding images and sound, which are controlled by video and audio parameters.

The play device 4 further includes an on screen display (OSD) system 404. The display device 2 includes an OSD system 204.

A user 10 can input a second OSD signal through a remote controller 6a from external of the player 4 or through a button 6b on a casing of the play device 4. The OSD system 404 is controlled by the second OSD signal, which controls the video and audio parameters of the play device 4.

Furthermore, the user 10 can also input a first OSD signal through a remote controller 8a from external of the display device 2 or through a button 8b on a casing of the display device 2. The OSD system 204 is controlled by the first OSD signal, which controls the video and audio parameters of the display device 2.

However, that the OSD systems 404 and 204 are separating, often annoys the user 10. For example, after turning on a projector and a DVD play device, the user 10 feels the sound is too loud. Then, the user 10 sends the second OSD signal to the OSD system 404 of the DVD play device through the remote controller 6a of the DVD play device. As a result, the sound of the DVD play device is lowered. However, the user 10 feels the sound is still too loud, and then the user 10 realizes that it is the sound of the projector too loud.

Then, the user 10 controls the remote controller 8a of the projector to input the first OSD signal. The first OSD signal is sent to the OSD system 204 of the projector. Finally, the sound of the projector is lowered. It is really inconvenient that the user 10 has to pass through all the troublesome steps in order to get adequate sound that the user 10 needs.

Therefore, the objective of the present invention is to provide a control system for controlling video and audio parameters of a display device and a play device in order to solve the above problem.

SUMMARY OF THE INVENTION

The present invention relates to a control system for controlling video and audio parameters of a display device and a play device. The display device receives video and audio data from the play device to display and generate corresponding images and sound. The video and audio parameters control the images and sound.

The control system includes an on screen display (OSD) system of the display device, an encoding/decoding module of the display device, a bus, an OSD system of the play device and an encoding/decoding module of the play device.

The OSD system of the display device is disposed in the display device for receiving a first OSD signal from external of the display device.

The encoding/decoding module of the display device is disposed in the display device for encoding the first OSD signal received by the OSD system into a first data signal.

The OSD system of the play device is disposed in the play device for receiving a second OSD signal from external of the play device.

The encoding/decoding module of the play device is disposed in the play device for encoding the second OSD signal received by the OSD system of the play device into a second data signal.

The bus is connected to both the display device and the play device. The bus is used for sending the first data signal out of the display device and then transmitting the first data signal to the play device. The bus is also used for sending the second data signal out of the play device and then transmitting the second data signal to the display device.

The displayer receives the first OSD signal from outside the displayer. Also, the displayer receives the second data signal from the player through the bus. The displayer decodes the second data signal into the first OSD signal by the encoding/decoding module of the display device. The video and audio parameters of the display device are controlled through two newest saved first OSD signals.

The play device received the second OSD signal from external of the play device. Also, the play device receives the first data signal from the display device through the bus. The play device decodes the first data signal into the second OSD signal by the encoding/decoding module of the play device. The video and audio parameters of the play device are controlled through two newest saved second OSD signals.

Therefore, the control system of the present invention is used for controlling the video and audio parameters of the display device and play device. The OSD system of the play device and the OSD system of the display device receive the OSD signals from external of the play device and the display device respectively. And the bus is used for transmitting those OSD signals between the display device and the play device. As a result, the video and audio parameters of the display device and play device are controlled synchronously. Furthermore, the displayed images and sound are controlled efficiently.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 2:
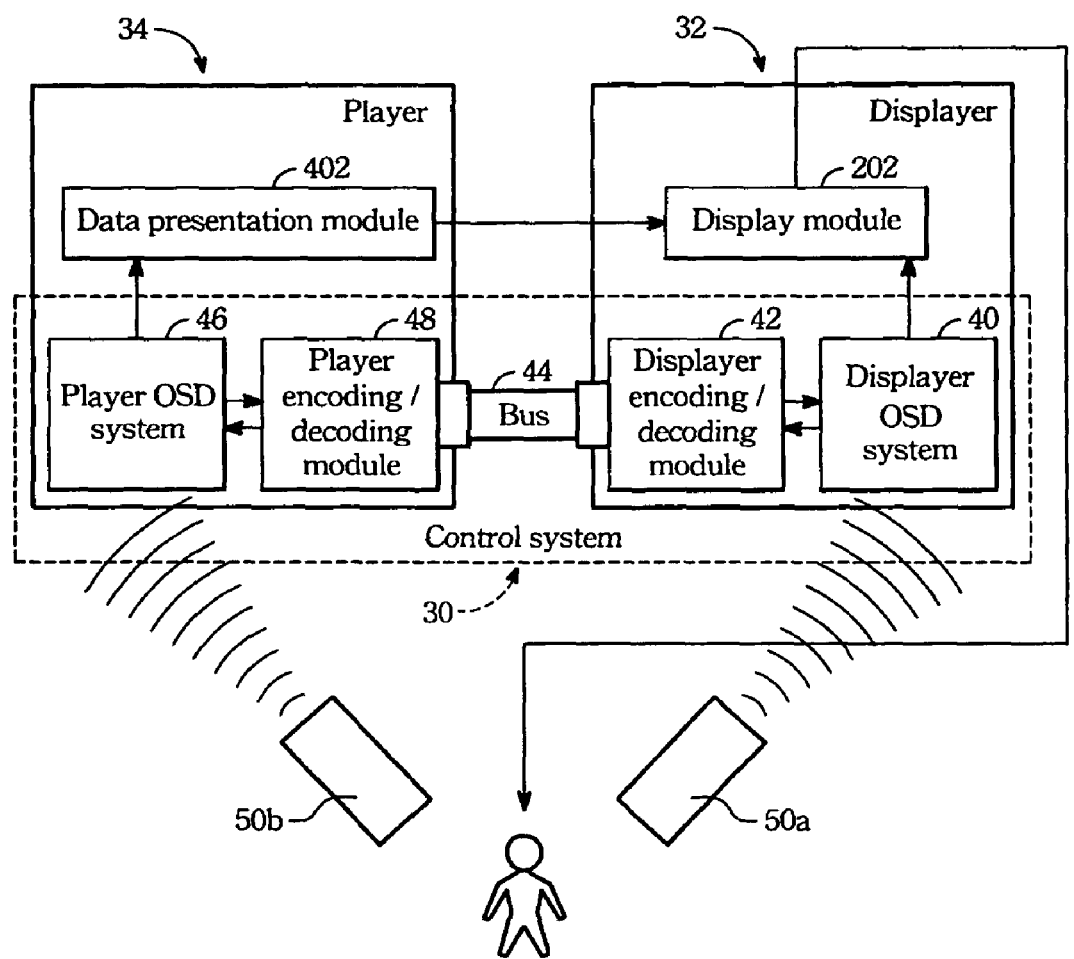
FIG. 2 illustrates a control system according to the present invention.

Please refer to FIG. 2. The present invention relates to a control system 30 for controlling video and audio parameters of a display device 32 and a play device 34. The display device 32, such as a television or a projector, receives video and audio data processed by a data presentation module 402 of the play device 34. For example, the play device 34 can be a DVD play device or a VCD play device. A display device module 202 of the display device 32 is used for displaying and generating corresponding images and sound. The video and audio parameters control the images and sound.

The control system 30 includes an on screen display (OSD) system 40, an encoding/decoding module 42, a bus 44, an OSD system 46 and an encoding/decoding module 48.

The OSD system 40 is disposed in the display device 32 for receiving a first OSD signal from external of the display device 32. The OSD system 40 receives the first OSD signal sent by a first remote controller 50a from external of the display device 32 or be generated by pressing a button (as shown in FIG. 1, not illustrated redundantly) on a casing of the display device 32.

The encoding/decoding module 42 is disposed in the display device 32 for encoding the first OSD signal received by the OSD system 40 into a first data signal.

The OSD system 46 is disposed in the play device 34 for receiving a second OSD signal from external of the play device 34.

Figure 1:
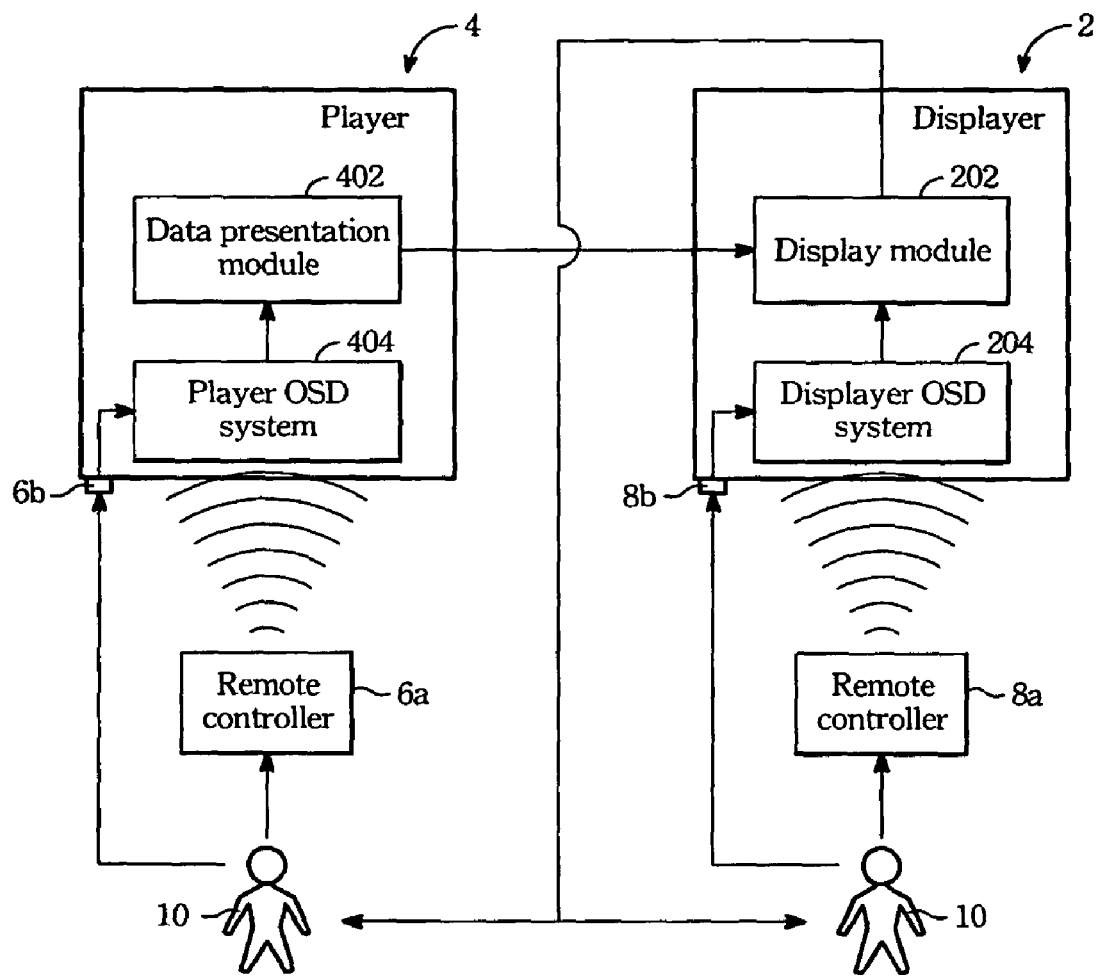
FIG. 1 illustrates a display device and a play device according to a prior art.

The OSD system 46 receives the second OSD signal sent by a second remote controller 50b from external of the play device 34 or be generated by pressing a button (as shown in FIG. 1, not illustrated redundantly) on the casing of the play device 34.

The encoding/decoding module 48 is disposed in the play device 34 for encoding the second OSD signal received by the OSD system 46 into a second data signal.

The bus 44 is connected to both the display device 32 and the play device 34. The bus 44 is used for sending the first data signal to the play device 34 from the display device 32. Then, the bus 44 is also used for sending the second data signal to the display device 32 from the play device 34.

The OSD system 40 of the display device 32 receives the first OSD signal from external of the display device 32, such as the first remote controller 50a. The display device 32 also receives the second data signal from the play device 34 through the bus 44. The encoding/decoding module 42 decodes the second data signal into the first OSD signal. Therefore, the OSD system 40 controls the video and audio parameters of the display device 32 by two newest saved first OSD signals.

The OSD system 46 of the play device 34 receives the second OSD signal from external of the play device 34, such as the second remote controller 50b. The play device 34 also receives the first data signal from the display device 32 through the bus 44. The encoding/decoding module 48 decodes the first data signal into the second OSD signal. Therefore, the OSD system 46 controls the video and audio parameters of the play device 34 by two newest saved second OSD signals.

Figure 3:
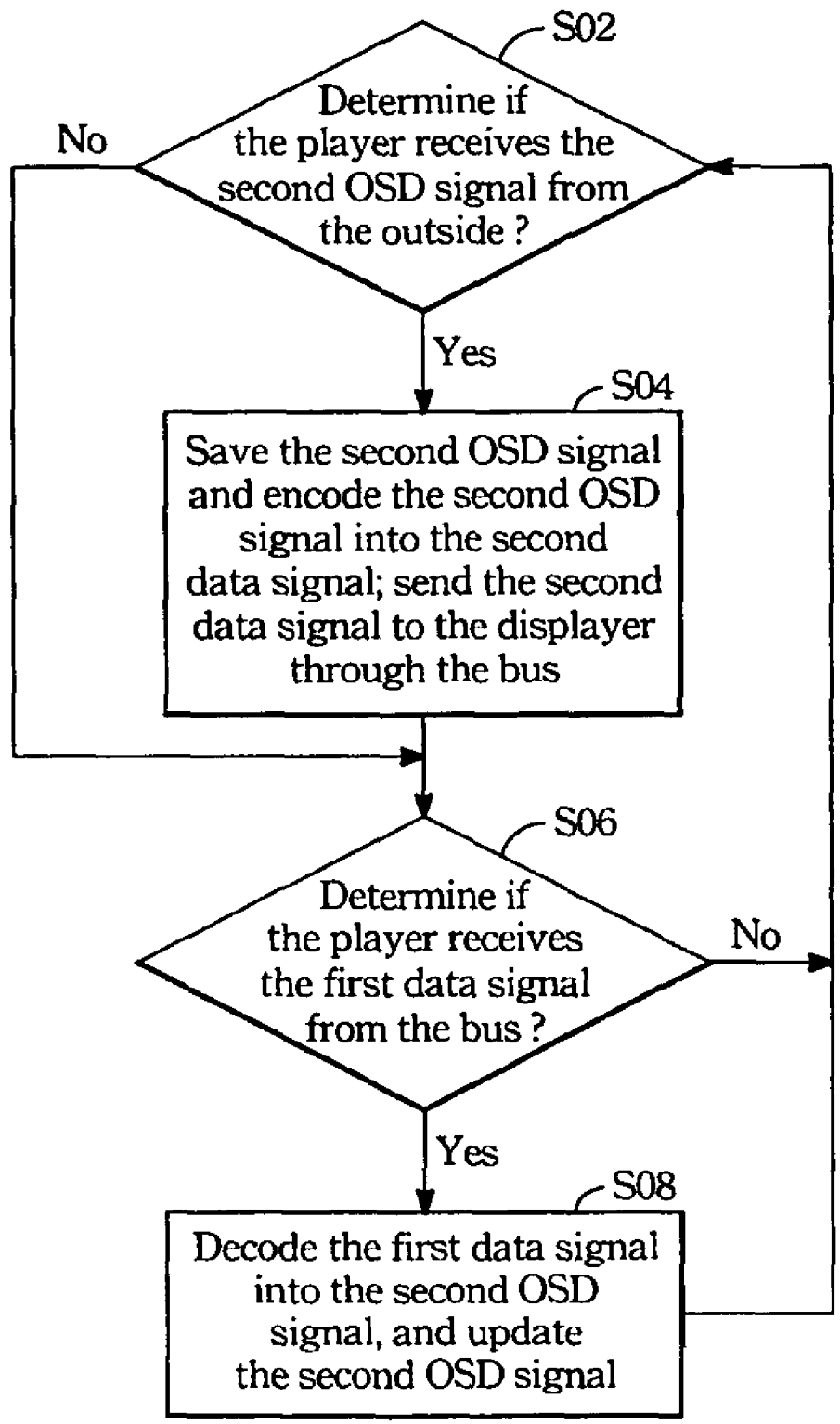
FIG. 3 is a flow chart of an implementation method of a control system in a play device according to the present invention.

Please refer to FIG. 3. The method of the control system 30 of the play device 34 according to the present invention includes following steps.

Step S02: determining whether the player 34 receives the second OSD signal from external of the player 34 or not.

If step S02 is true, then it goes to step S04: saving the second OSD signal and encoding the second OSD signal into the second data signal. The second data signal is sent to the display device 32 through the bus 44.

If step S02 is false, or if step S04 is done, then it goes to step S06: determining whether the play device 34 receives the first data signal from the bus 44 or not.

If step S06 is true, then it goes to step S08: decoding the first data signal into the second OSD signal, and updating the second OSD signal.

If step S06 is false, or if step S08 is done, then it goes back to the step S02. In the step S02, the play device 34 controls the video and audio parameters by a newest saved second OSD signal.

Figure 4:
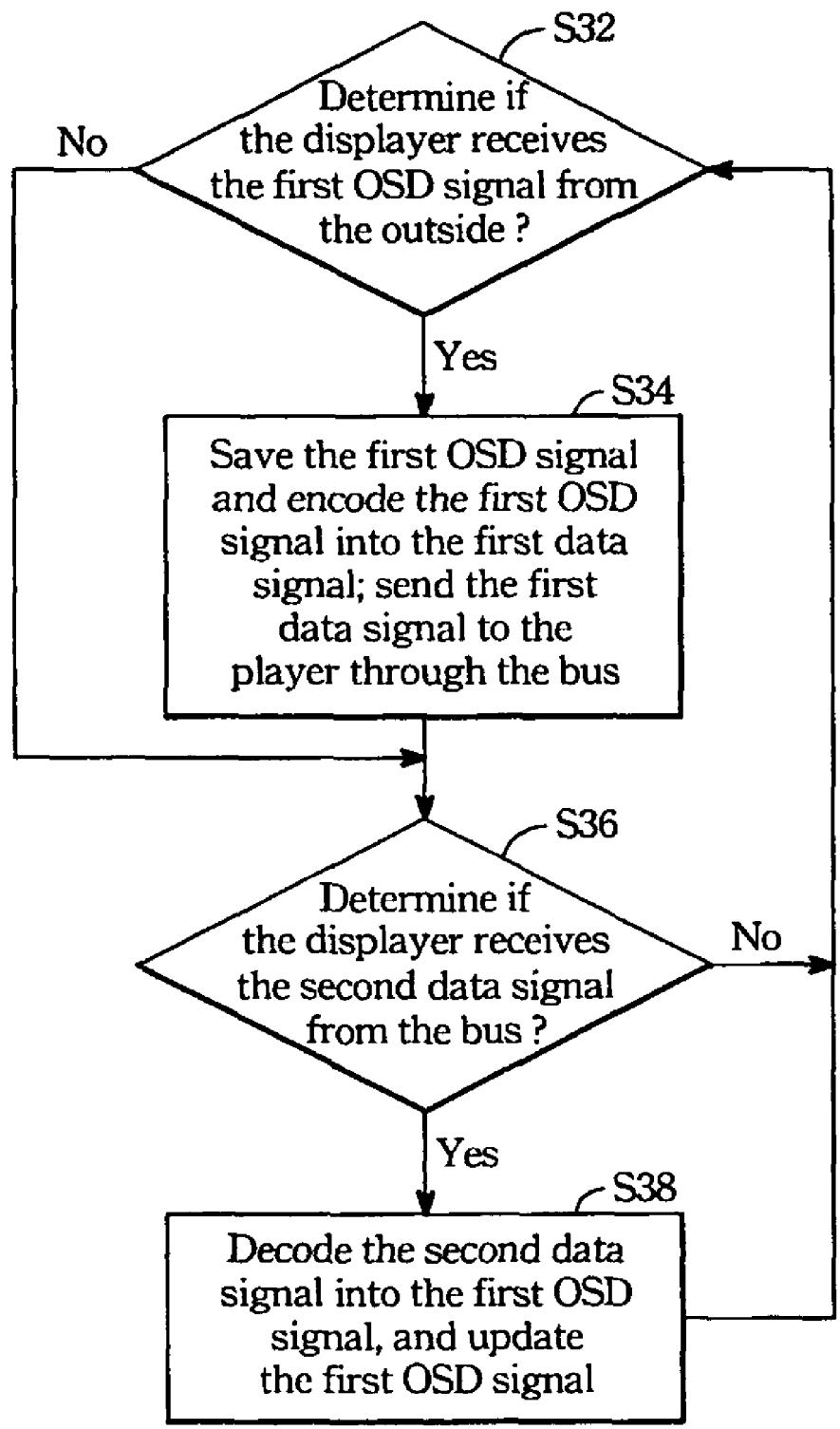
FIG. 4 is a flow chart of an implementation method of a control system in a display device according to the present invention.

Please refer to FIG. 4. The implementation method of the display device 32 in the control system 30 according to the present invention includes following steps.

S32: determining whether the display device 32 receives the first OSD signal from external of the display device 32 or not.

If step S32 is true, then it goes to step S34: saving the first OSD signal and encoding the first OSD signal into the first data signal. The first data signal is sent to the play device 34 through the bus 44.

If step S32 is false, or if the S34 is done, then it goes to step S36: determining if the display device 32 receives the second data signal from the bus 44.

If step S36 is true, then it goes to step S38: decoding the second data signal into the first OSD signal, and updating the first OSD signal.

If step S36 is false, or if step S38 is done, then it goes to step S32. The display device 32 controls the video and audio parameters by the newest saved first OSD signal.

Through the interaction of FIG. 3 and FIG. 4, the newest and consistent OSD signals are obtained in the latest time. The video and audio parameters of the display device 32 and play device 34 are controlled synchronously by the OSD signals.

Therefore, the control system 30 of the present invention is used for controlling the video and audio parameters of the display device 32 and play device 34. The OSD signals are received from external of the play device 34 and the display device 32 by the OSD system 46 and the OSD system 40 respectively. The bus 44 transmits the OSD signals between the play device 34 and display device 32, so that the video and audio parameters of the display device 32 and play device 34 are controlled synchronously. Therefore, the displayed images and sound are controlled more efficiently.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

We claim:

1. A control system used for controlling video and audio parameters of a display device and a play device, the display device receiving video and audio data from the play device to display and generate corresponding images and sound, the video and audio parameters controlling the images and sound, the control system comprising:

an on screen display (OSD) system of the display device disposed in the display device for receiving a first OSD signal from external of the display device;

an encoding/decoding module of the display device disposed in the display device for encoding the first OSD signal received by the OSD system into a first data signal; and a bus connected to the display device for sending the first data signal out of the display device and transmitting the first data signal to the play device;

wherein the display device receives the first OSD signal to control the video and audio parameters of the display device, the play device is decoding the first data signal received from the bus to control the video and audio parameters of the play device.

2. The control system of claim 1, wherein the first OSD signal is sent by a first remote controller.

3. The control system of claim 1, wherein the first OSD signal is generated by pressing a button on a casing of the display device.

4. The control system of claim 1 further comprising:

an OSD system of the play device disposed in the play device for receiving a second OSD signal from external of the play device; and an encoding/decoding module of the play device disposed in the play device for encoding the second OSD signal into a second data signal;

wherein the bus is connected to the play device for sending the second data signal out of the play device, and then transmitting the second data signal to the display device, the play device is receiving the second OSD signal to control the video and audio parameters of the play device, the display device is decoding the second data signal received through the bus into the first OSD signal to control the video and audio parameters of the display device.

5. The control system of claim 4, wherein the encoding/decoding module of the play device is also used for decoding the first data signal received from the display device through the bus into the second OSD signal.

6. The control system of claim 4, wherein the encoding/decoding module of the display is also used for decoding the second data signal received from the play device through the bus into the first OSD signal.

7. The control system of claim 4, wherein the second OSD signal is sent by a second remote controller.

8. The control system of claim 4, wherein the second OSD signal is generated by pressing a button on a casing of the play device.

9. The control system of claim 1, wherein the display device is a projector.

10. The control system of claim 1, wherein the display device is a television.

11. A control system for controlling video and audio parameters of a display device and a play device, the display device receiving video and audio data from the play device to display and generate corresponding images and sound, the video and audio parameters controlling the images and sound, the control system comprising:

an on screen display (OSD) system of the play device disposed in the play device for receiving a second OSD signal from external of the play device;

an encoding/decoding module of the play device disposed in the play device for encoding the second OSD signal received by the OSD system of the play device into a second data signal; and a bus connected to the play device for sending the second data signal out of the play device, and then transmitting the second data signal to the display device;

wherein the play device receives the second OSD signal to control the video and audio parameters of the play device, the display device is decoding the second data signal received through the bus into a first OSD signal to control the video and audio parameters of the display device.

12. The control system of claim 11, wherein the second OSD signal is sent by a second remote controller.

13. The control system of claim 11, wherein the second OSD signal is generated by pressing a button on a casing of the play device.

14. The control system of claim 11 further comprising:

an OSD system of the display device disposed in the display device for receiving the first OSD signal from external of the display device; and an encoding/decoding module of the display device disposed in the display device for encoding the first OSD signal received by the OSD system of the display device into a first data signal;

wherein the bus is connected to the display device for sending the first data signal out of the display device and then transmitting the first data signal to the play device, the display device is receiving the first OSD signal to control the video and audio parameters of the display device, the play device is decoding the first data signal received through the bus into the second OSD signal to control the video and audio parameters of the play device.

15. The control system of claim 14, wherein the encoding/decoding module of the display device is also used for decoding the second data signal received from the play device though the bus into the first OSD signal.

16. The control system of claim 14, wherein the encoding/decoding module of the play device is used for decoding the first data signal received from the display device through the bus into the second OSD signal.

17. The control system of claim 14, wherein the first OSD signal is sent by a first remote controller.

18. The control system of claim 14, wherein the first OSD signal is generated by pressing a button on a casing of the display device.

19. The control system of claim 11, wherein the display device is a projector.

20. The control system of claim 11, wherein the display device is a television.

* * * * *